（12) United States Patent
Faus et al.

(10) Patent No.: US 9,032,367 B2
(45) Date of Patent: May 12, 2015

(54) PROVIDING A DEMO APPLIANCE AND MIGRATING THE DEMO APPLIANCE TO A PRODUCTION APPLIANCE

(75) Inventors: Norman L. Faus, Raleigh, NC (US); David P. Huff, Raleigh, NC (US); Bryan M. Kearney, Raleigh, NC (US); James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1142 days.

(21) Appl. No.: 12/130,982

(22) Filed: May 30, 2008

(65) Prior Publication Data
US 2009/0300584 A1 Dec. 3, 2009

(51) Int. Cl.
G06F 9/44 (2006.01)

(52) U.S. Cl.
CPC .......................................... G06F 8/71 (2013.01)

(58) Field of Classification Search
CPC ......... G06F 8/71; G06F 9/44505; G06F 8/20; G06F 8/61; G06F 8/36
USPC .......................................................... 717/121
See application file for complete search history.

(56) References Cited

U.S. PATENT DOCUMENTS

| 6,367,077 | B1 | 4/2002 | Brodersen et al. | |
|---|---|---|---|---|
| 6,578,199 | B1 | 6/2003 | Tsou et al. | |
| 7,461,095 | B2 | 12/2008 | Cohen et al. | |
| 7,624,394 | B1 | 11/2009 | Christopher, Jr. | |
| 7,945,897 | B1 | 5/2011 | Cook | |
| 7,996,648 | B2 | 8/2011 | England et al. | |
| 8,074,201 | B2 * | 12/2011 | Ghercioiu et al. | 717/107 |
| 8,181,174 | B2 | 5/2012 | Liu | |
| 8,255,650 | B1 | 8/2012 | Gruttadauria et al. | |
| 2002/0029326 | A1 | 3/2002 | Reuter et al. | |
| 2002/0086688 | A1 | 7/2002 | Kang | |
| 2002/0112171 | A1 * | 8/2002 | Ginter et al. | 713/185 |
| 2002/0129352 | A1 | 9/2002 | Brodersen et al. | |
| 2003/0160823 | A1 * | 8/2003 | Stannard | 345/764 |
| 2003/0220835 | A1 * | 11/2003 | Barnes, Jr. | 705/14 |
| 2005/0044541 | A1 | 2/2005 | Parthasarathy et al. | |
| 2005/0044546 | A1 * | 2/2005 | Niebling et al. | 717/177 |
| 2005/0125513 | A1 * | 6/2005 | Sin-Ling Lam et al. | 709/220 |
| 2006/0101451 | A1 * | 5/2006 | Fong | 717/168 |

(Continued)

OTHER PUBLICATIONS

Office Action for U.S. Appl. No. 12/040,834 mailed Jul. 18, 2011.

(Continued)

*Primary Examiner* — Li B Zhen
*Assistant Examiner* — Arshia S Kia
(74) *Attorney, Agent, or Firm* — Lowenstein Sandler LLP

(57) ABSTRACT

An appliance support module can be configured to receive a request to build a demo software appliance from a user. The appliance support module can be configured to build the demo appliance and to include configuration data in demo software appliance. The appliance support module can be configured to receive a request to migrate the demo software appliance to a production software appliance. The appliance support module can be configured to migrate the demo software appliance by modifying the configuration data in order to provide full functionality to the demo software appliance that was previously limited. The appliance support module can also receive a request to scale the production software appliances. The appliance support module can scale the production software appliance by dividing the applications contained in the production software appliances into separate software appliance.

15 Claims, 6 Drawing Sheets

(56) References Cited

U.S. PATENT DOCUMENTS

| | | | |
|---|---|---|---|
| 2006/0146991 A1* | 7/2006 | Thompson et al. | 379/67.1 |
| 2006/0155735 A1 | 7/2006 | Traut et al. | |
| 2006/0218547 A1 | 9/2006 | Purkeypile et al. | |
| 2007/0053513 A1* | 3/2007 | Hoffberg | 380/201 |
| 2007/0074201 A1 | 3/2007 | Lee | |
| 2007/0078988 A1* | 4/2007 | Miloushev et al. | 709/227 |
| 2007/0159650 A1* | 7/2007 | Takamatsu et al. | 358/1.15 |
| 2007/0169079 A1 | 7/2007 | Keller et al. | |
| 2007/0245332 A1 | 10/2007 | Tal et al. | |
| 2007/0250672 A1 | 10/2007 | Stroberger et al. | |
| 2007/0294314 A1 | 12/2007 | Padovano et al. | |
| 2008/0004904 A1* | 1/2008 | Tran | 705/2 |
| 2008/0022271 A1 | 1/2008 | D'Angelo et al. | |
| 2008/0034364 A1 | 2/2008 | Lam et al. | |
| 2008/0052384 A1 | 2/2008 | Marl et al. | |
| 2008/0082601 A1 | 4/2008 | Meijer et al. | |
| 2008/0086727 A1* | 4/2008 | Lam et al. | 718/1 |
| 2008/0086728 A1 | 4/2008 | Lam et al. | |
| 2008/0178144 A1* | 7/2008 | Bazigos et al. | 717/101 |
| 2008/0215796 A1* | 9/2008 | Lam et al. | 711/100 |
| 2008/0263258 A1 | 10/2008 | Allwell | |
| 2009/0064086 A1 | 3/2009 | Faus | |
| 2009/0083734 A1 | 3/2009 | Hotra | |
| 2009/0103722 A1* | 4/2009 | Anderson et al. | 380/44 |
| 2009/0144718 A1 | 6/2009 | Boggs | |
| 2009/0210869 A1 | 8/2009 | Gebhart et al. | |
| 2009/0217244 A1 | 8/2009 | Bozak et al. | |
| 2009/0217255 A1* | 8/2009 | Troan | 717/168 |
| 2009/0217263 A1 | 8/2009 | Gebhart et al. | |
| 2009/0222805 A1 | 9/2009 | Faus | |
| 2009/0222806 A1 | 9/2009 | Faus | |
| 2009/0222808 A1 | 9/2009 | Faus | |
| 2009/0249488 A1 | 10/2009 | Robinson et al. | |
| 2009/0299920 A1* | 12/2009 | Ferris et al. | 705/418 |
| 2009/0300164 A1 | 12/2009 | Boggs | |
| 2009/0300593 A1 | 12/2009 | Faus | |
| 2009/0300601 A1 | 12/2009 | Faus | |
| 2010/0306773 A1* | 12/2010 | Lee et al. | 718/1 |
| 2011/0035733 A1 | 2/2011 | Horning et al. | |
| 2011/0153697 A1* | 6/2011 | Nickolov et al. | 707/827 |
| 2011/0170837 A1 | 7/2011 | Barnes, Jr. | |

OTHER PUBLICATIONS

Office Action for U.S. Appl. No. 12/040,834 mailed Jan. 20, 2012.
Office Action for U.S. Appl. No. 12/040,834 mailed Aug. 30, 2012.
Office Action for U.S. Appl. No. 12/040,834 mailed Jan. 30, 2013.
Office Action for U.S. Appl. No. 12/040,834 mailed Jun. 16, 2013.
Office Action for U.S. Appl. No. 12/040,834 mailed Oct. 21, 2013.
Office Action for U.S. Appl. No. 12/040,834 mailed May 29, 2014.
Notice of Allowance for U.S. Appl. No. 12/040,834 mailed Sep. 10, 2014.
Office Action for U.S. Appl. No. 12/131,004 mailed Aug. 16, 2011.
Office Action for U.S. Appl. No. 12/131,004 mailed Mar. 13, 2012.
Office Action for U.S. Appl. No. 12/131,004 mailed Sep. 28, 2012.
Office Action for U.S. Appl. No. 12/131,004 mailed Jan. 30, 2013.
Office Action for U.S. Appl. No. 12/131,004 mailed May 20, 2013.
Office Action for U.S. Appl. No. 12/131,004 mailed Oct. 23, 2013.
Office Action for U.S. Appl. No. 12/131,004 mailed Mar. 27, 2014.
Notice of Allowance for U.S. Appl. No. 12/131,004 mailed Sep. 24, 2014.
Office Action for U.S. Appl. No. 12/040,810 mailed Jul. 22, 2011.
Office Action for U.S. Appl. No. 12/040,810 mailed Jun. 5, 2012.
Office Action for U.S. Appl. No. 12/040,810 mailed Sep. 28, 2012.
Office Action for U.S. Appl. No. 12/040,810 mailed Jan. 29, 2013.
Office Action for U.S. Appl. No. 12/040,810 mailed May 23, 2013.
Office Action for U.S. Appl. No. 12/040,810 mailed Nov. 5, 2013.
Office Action for U.S. Appl. No. 12/040,810 mailed Mar. 27, 2014.
Advisory Action for U.S. Appl. No. 12/040,810 mailed Aug. 14, 2012.
Advisory Action for U.S. Appl. No. 12/040,810 mailed Apr. 8, 2013.
Advisory Action for U.S. Appl. No. 12/040,810 mailed Feb. 10, 2014.
Notice of Allowance for U.S. Appl. No. 12/040,810 mailed Aug. 19, 2014.
Office Action for U.S. Appl. No. 12/128,299 mailed Aug. 17, 2011.
Office Action for U.S. Appl. No. 12/128,299 mailed Jan. 31, 2012.
Office Action for U.S. Appl. No. 12/128,299 mailed Sep. 17, 2012.
Office Action for U.S. Appl. No. 12/128,299 mailed Feb. 7, 2013.
Office Action for U.S. Appl. No. 12/128,299 mailed May 6, 2013.
Office Action for U.S. Appl. No. 12/128,299 mailed Oct. 9, 2013.
Office Action for U.S. Appl. No. 12/128,299 mailed Mar. 20, 2014.
Office Action for U.S. Appl. No. 12/128,299 mailed Sep. 9, 2014.
Notice of Allowance for U.S. Appl. No. 12/128,299 mailed Dec. 3, 2014.
Reimer, Darrell, et al., "Opening Black Boxes: Using Semantic Information to Combat Virtual Machine Image Sprawl," published in VEE'08 Proceedings of the fourth ACM SIGPLAN/SIGOPS international conference on Virtual execution environments, pp. 111-120, ACM New York, NY, USA © 2008, table of contents ISBN: 978-1-59593-796-4.
Gerla, Tim, Field Engineer, rPath, Inc. "From Application to Appliance Building Software Appliances with rPath's rBuilder," 15 pages, Apr. 14, 2008.

* cited by examiner

PROVIDING A DEMO APPLIANCE AND MIGRATING THE DEMO APPLIANCE TO A PRODUCTION APPLIANCE

FIELD

This invention relates generally to products and services, more particularly, to systems and methods for software appliance related services and products.

DESCRIPTION OF THE RELATED ART

The proliferation of the World Wide Web through the Internet has made a wealth of products and services available to users to purchase and use nearly instantaneously. Vendors, service providers, manufacturers, third party distributors, etc., may have websites for the users to review and purchase their respective products and/or services and to obtain technical support for the products and/or services.

Often, consumers desire to test software products prior to purchasing the product. Typically, software vendors and manufacturers will offer a limited or reduced functionality version of their software products. This allows the consumers to review and test the software products prior to purchasing the product. The limited-functionality versions, however, are generic and not specific to any particular consumer. Additionally, in order to move to a full version of the product from the limited version may require a significant amount of effort to install and configure the software product. Thus, there is a need in the art for methods and systems that provide test or demo software products that can be tailored to a specific user and that can be easily migrated to full-featured production software products.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
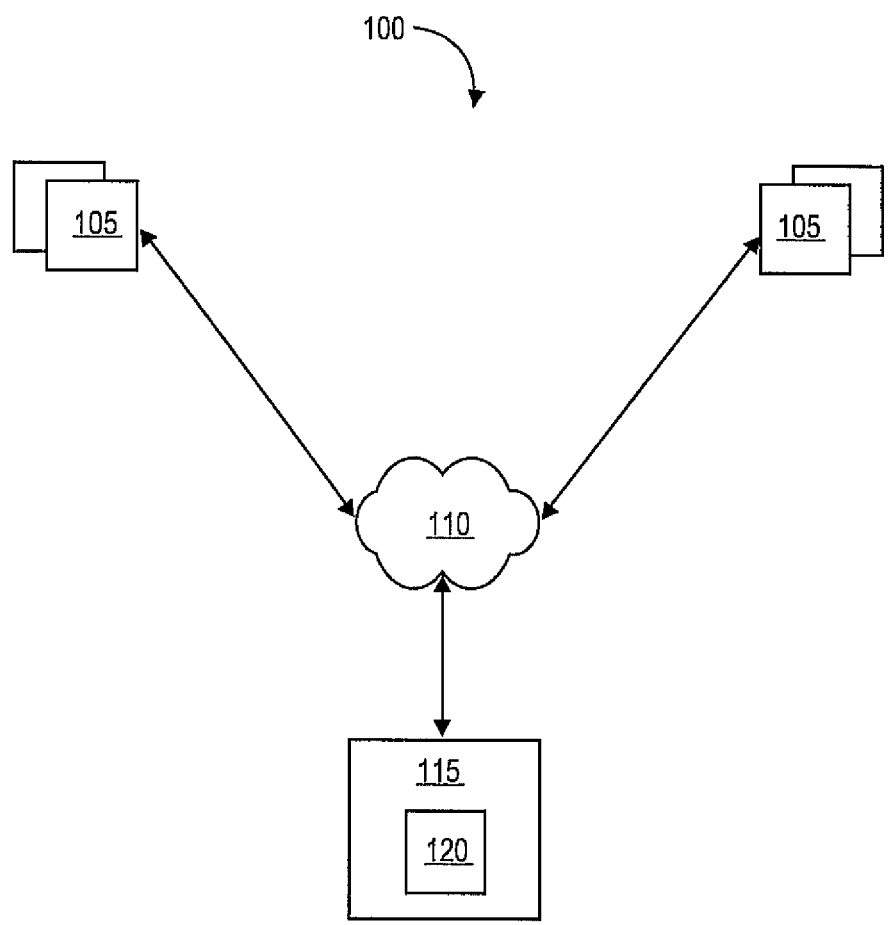
FIG. 1 depicts an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

According to various embodiments, in general, an appliance support module can be configured to build demo software appliances for evaluation by a user and migrate the demo appliances into production. An appliance support module can be configured to receive a request to build a demo software appliance from a user. The request can include a desired pre-built demo appliance or available applications to be included in a custom demo appliance. The appliance support module can be configured to build the demo appliance by retrieving the pre-configured demo appliance or by constructing the custom demo appliance. To construct the custom demo appliance, the appliance support module can be configured to combine the applications with a minimum amount of an operating system to provide an execution platform for the applications. After the demo software appliance is built, the appliance support module can be configured to provide the demo software appliance to the requesting user.

In embodiments, the appliance support module can be configured to include configuration data in the demo software appliance. The configuration data can include data that specifies the interaction of the applications and portions of OS in the demo software appliance. Additionally, the configuration data can include user specific data. In order to operate as a demo software appliance, the configuration data can be defined in order to limit the functionality of the demo software appliance.

In embodiments, the appliance support module can be configured to receive a request to migrate the demo software appliance to a production software appliance. The production software appliance can have the functionality that was previously limited in the demo software appliance. The appliance support module can be configured to migrate the demo software appliance by modifying the configuration data in order to provide full functionality to the demo software appliance that was previously limited.

In embodiments, the appliance support module can also receive a request to scale the production software appliance. The appliance support module can scale the production software appliance by dividing the applications contained in the production software appliances into separate software appliances. To achieve scaling, the appliance support module can be configured to build the separate software appliances and allocate the appropriate configuration data to the separate software appliances. Additionally, the appliance support module can modify the configuration data to include any additional configuration data required by the separate software appliances to function together to provide the overall functionality.

By allowing a user to request a tailor-made demo appliance, users can test and evaluate a particular software product or solution specifically configured to their needs. Additionally, by providing a mechanism to migrate the demo appliance to a production appliance, the user can easily and efficiently move the software products or solution into production and operation while saving time and resources in the process. Additionally, by allowing a user to scale the appliance, the user can divide a single production appliance into multiple production appliances without having to request and configure each separate appliance. As such, the user can increase the power of the production appliance by having separate appliances which can be supported by dedicated computing resources.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes users 105, a network 110 and a web service portal 115. Users 105 can be private individuals, employees of private business or public entities or other persons interested in accessing web service portal 115. Users 105 can access web service portal 115 using personal computers, personal mobile devices, workstations or other networked computing platforms.

Network 110 can be a combination of wide area and local area networks such as the Internet. Network 110 can be configured to provide a communication channel between users 105 and web service portal 115. Network 110 can implement a variety of network protocols to provide the communication channel such as Internet Protocol ("IP") Vx, ATM, SONET, or other similar network protocols.

Web service portal 115 can be configured to provide products and services to user 105 as well as provisioning, installation services, updates to software and hardware products and technical support. Web service portal 115 can, among other functions, provide a list of products such as software applications, software appliances and/or hardware devices as well as services such as installation, configuration, maintenance, etc., for users 105 to purchase. As a non-limiting example, web service portal 115 can also provide information for users to research, compare and purchase software, hardware and consulting services in support of those software and/or hardware purchases. Web service portal 115 can also be configured to provide support services, for free or by subscription, to those same software, service, and/or hardware purchases.

In accordance with various embodiments, web service portal 115 can be configured to provide an appliance support (AS) module 120 to provide software appliances to user 105 and support the software appliances.

Figure 2:
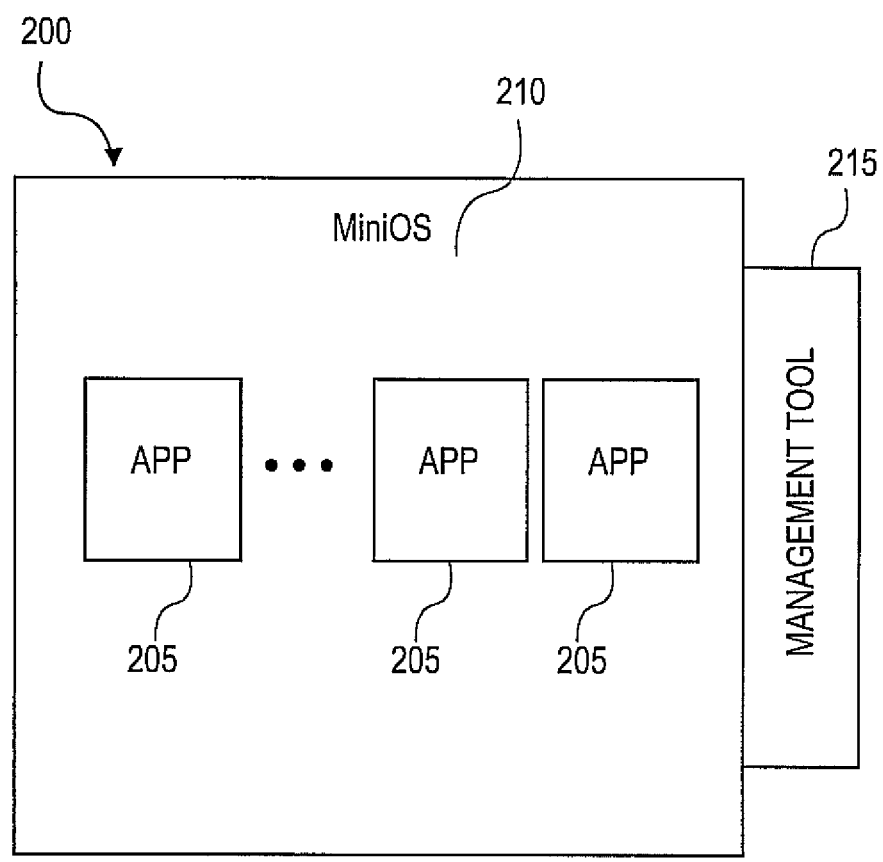
FIG. 2 illustrates an exemplary software appliance in accordance with various embodiments.

FIG. 2 shows an exemplary software appliance according to various embodiments. As shown, a software appliance 200 can comprise one or more applications 205 combined with a "minimum amount of an operating system" (MiniOS) 210 to allow application(s) 205 to run on a computing platform or in a virtual machine executing on a computing platform. MiniOS 210 can comprise a subset of the components of a complete OS that contains enough resources to support the application(s) 205 intended to be encapsulated with MiniOS 210. Software appliance 200 occupies less space than regular or self-standing applications and independent OSes, because MiniOS 210 includes a set of reduced features and components required to provide an application space for application(s) 205 of the software appliance.

Software appliance 200 comprises a binary image of application(s) 205 and selected MiniOS 210 contained in software appliance 200. The image contains the bits of software appliance 200 as installed on a computing platform. As such, to place software appliance 200 on computing platform, software appliance 200 only needs to be physically copied to the memory or storage of the computing platform and, then, configured to function with the computing platform or virtual machine running on the computing platform. In embodiments, software appliance 200 can be distributed via media such as CD-ROM, DVD-ROM, high-definition format discs or flash media, transmitted via a network, or can be downloaded from a Web site or other location.

Software appliance 200 can streamline the distribution of applications by minimizing the tasks typically associated with installation, configuration and maintenance. Software appliance 200 is completely functional as a self-contained unit, and requires no separately installed or configured OS to function. Inside software appliance 200, application(s) 205 and MiniOS 210 are pre-configured to function and operate together. As such, once software appliance 200 is placed on a computing platform or virtual machine, software appliance 200 only requires a configuration of the software appliance to the computing platform or virtual machine.

Additionally, software appliance 200 can be pre-configured for a specific client or computing platform on which it will be placed. Specifically, during creation of software appliance 200, MiniOS 210 and application(s) 205 of software appliance 200 can be pre-configured with the settings and parameters of the client or computing platform on which it will be placed. For example, if software appliance 200 includes a server OS and Email server application, the server OS and Email server application can be pre-configured to operate with the network settings of the computing platform it will be placed and the network it will serve. Accordingly, software appliance 200 needs only to be placed on the target client or computing platform without additional configuration. In embodiments, software appliance 200 can be installed to a variety of clients, servers or other target devices, such as network servers, personal computers, network-enabled cellular telephones, personal digital assistants, media players, and others, such as illustrated in FIG. 1 above.

Software appliance 200 can also be updated and upgraded by several different processes. Since software appliance 200 is a binary image, an updated or upgraded software appliance can be created as a completely new binary image of the entire software appliance incorporating the updates or upgrades. To update or upgrade software appliance 200 using a complete image, the updated or upgraded appliance can simply replace software appliance 200. Alternatively, software appliance 200 can be updated or upgraded incrementally. For each update or upgrade, the bits of the binary image required to update or upgrade software appliance 200 can be determined. To update or upgrade software appliance 200, the update bits can be added to software appliance 200 on a binary-difference basis.

Software appliance 200 can also be configured to communicate with a management tool 215. Management tool 215 can for example be utilized in order to start/stop, configure, repair, and update software appliance 200. Management tool 215 can manage the entire software appliance 200, including both application(s) 205 and MiniOS 210. Likewise, management tool 215 can include multiple tools, for instance to manage application(s) 205 and MiniOS 210, separately.

According to embodiments, management tool 215 can be embedded in software appliance 200 itself. In such implementations, software appliance 200 can be managed from the particular computing platform on which it is placed.

Returning to FIG. 1, according to various embodiments, AS module 120 can be configured to receive a request to build a demo software appliance from a user. The request can include a desired pre-built demo appliance or available applications to be included in a custom demo appliance. AS module 120 can be configured to build the demo appliance by retrieving the pre-configured demo appliance or by constructing the custom demo appliance. To construct the custom demo appliance, AS module 120 module can be configured to combine the applications with a minimum amount of an operating system to provide an execution platform for the applications. After the demo software appliance is built, AS module 120 can be configured to provide the demo software appliance to the requesting user.

In embodiments, AS module 120 can be configured to include configuration data in demo software appliance. The configuration data can include data that specifies the interaction of the applications and portions of OS in the demo software appliance. Additionally, the configuration data can include user specific data. In order to operate as a demo software appliance, the configuration data can be defined in order to limit the functionality of the demo software appliance.

In embodiments, the AS module 120 can be configured to receive a request to migrate the demo software appliance to a production software appliance. The production software appliance can have the functionality that was previously limited in the demo software appliance. The AS module 120 can be configured to migrate the demo software appliance by modifying the configuration data in order to provide full functionality to the demo software appliance that was previously limited.

In embodiments, the AS module 120 can also receive a request to scale the production software appliance. The AS module 120 can scale the production software appliance dividing the applications contained in the production software appliances into separate software appliances. To achieve scaling, the AS module 120 can be configured to build the separate software appliances and allocate the appropriate configuration data to the separate software appliances. Additionally, the AS module 120 can modify the configuration data to include any additional configuration data required by the separate software appliances to function together to provide the overall functionality.

Figure 3:
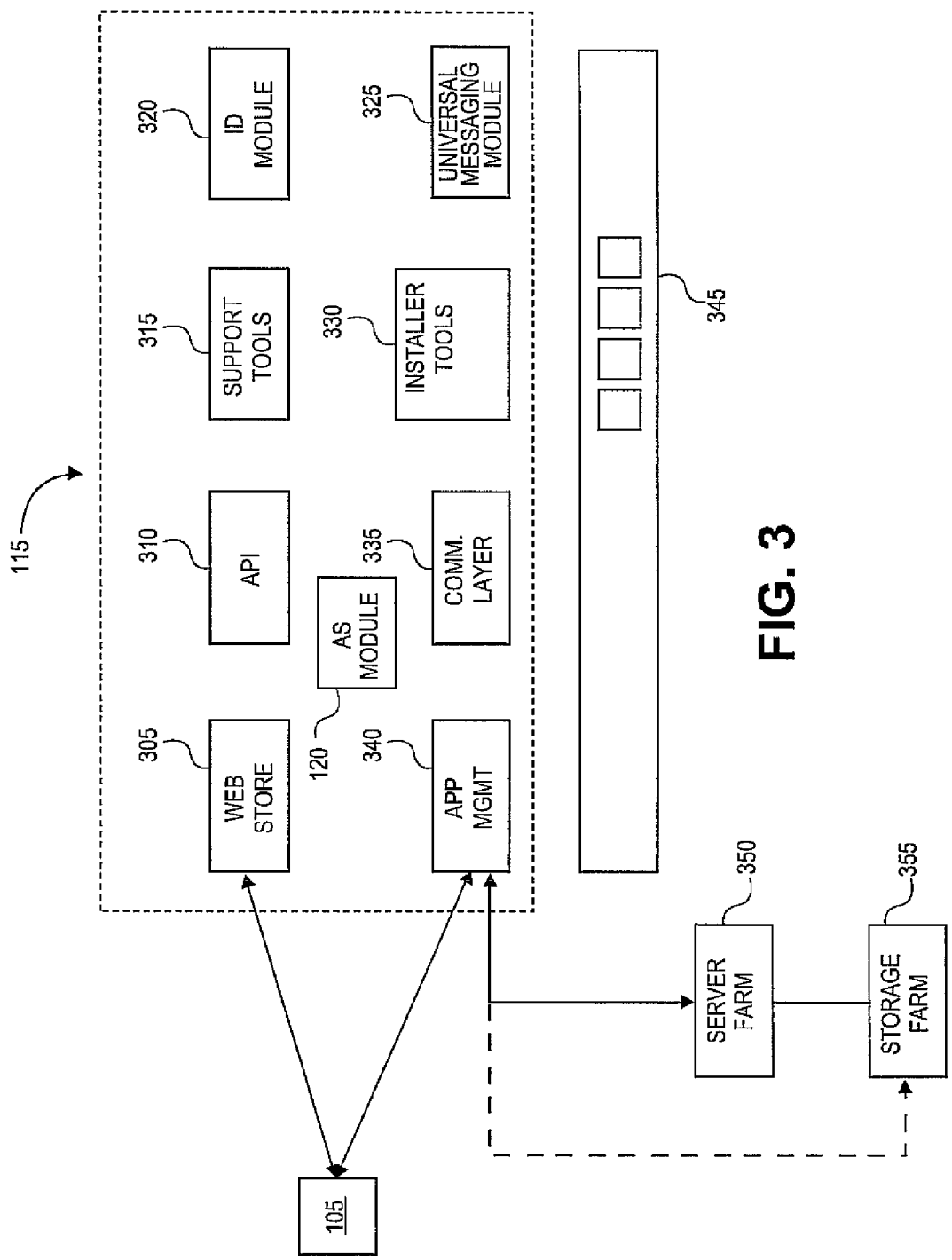
FIG. 3 illustrates an exemplary service portal of the system shown in FIG. 1 in accordance with another embodiment.

FIG. 3 illustrates a more detailed block diagram of web service portal 115 including AS module 120 in accordance with another embodiment. It should be readily apparent to those of ordinary skill in the art that web service portal 115 depicted in FIG. 3 represents a generalized schematic illustration and that other components may be added or existing components may be removed or modified.

As shown in FIG. 3, web service portal 115 can include a web store module 305 that a user can interface with the service portal. Web store module 305 can provide the graphical user interfaces ("GUIs") and associated functions and/or services for web service portal 115. As a non-limiting example, web store module 305 can generate a log-in GUT for a user to authenticate and enter web service portal 115.

Web store module 305 can couple with an application program interface ("API") module 310. API module 310 can be configured to provide an interface between the functions and/or services provided by web store module 305 and to the appropriate module of web service portal 115. More particularly, API module 310 can call or direct a requested function or service from the user to the respective module that provides that requested function or service. For example, a user may request a price of a product, e.g., product vending module, API module 310 can direct the request to a get price function in a support tools module 315. Additionally, a user may request a software appliance, API module 310 can direct the request to AS module 120.

API module 310 can also be configured to interface with support tools module 315. Support tools module 315 can be configured to provide the supporting software and hardware to implement the functionality of web service portal 115. Support tools module 315 can contain and provide access to databases that contain information such as product lines, software appliances services providers, on-line self-help (e.g., knowledgebase), etc. Support tools module 315 can also provide services like a chat service, a help desk, installation, provisioning, etc.

API module 310 can be further configured to couple with an identification ("ID") module 320. ID module 320 can be configured to provide identification management services for web service portal 115. ID module 320 can also store information related to users such as purchase history, user profile, usage history of the user, and entitlement data.

API module 310 can be further configured to couple with a universal messaging module 325. Universal messaging module 325 can be configured to provide a messaging application that unifies messages. More specifically, electronic mail ("email"), documents, and instant messaging can be linked in a single application. Universal messaging module 325 can also provide a mechanism for a user to view all the related documents for the user from email to Wiki pages.

An installer tools 330 can be coupled to API module 310. One of the services provided by web service portal 115 can be the purchase of software applications and software appliances provided by independent software vendors ("ISVs"). As part of the delivery of the software applications and appliances, the ISV can be required to maintain and update the installation tools to install their respective software applications and appliances. Accordingly, installer tools 330 can be a repository where independent software vendors can deposit their respective installation tools.

API module 310 can be further coupled to a communication layer 335 (labeled as COMM layer in FIG. 3). Communication layer 335 can be configured to provide the underlying services for the modules of web service portal 115 to communicate. For example, communication layer 335 can contain middleware for a product database to communicate with a graphical user interface requesting product description.

API module 310 can be further coupled to an application management module 340 (labeled as APP MGMT in FIG. 3). Application management module 340 can be configured to manage applications as requested by users. More specifically, a user may purchase a prepackaged software application pack (e.g., an operating system, electronic mail program and data mining program) from web service portal 115, which is stored in an application stack module 345. Application management module 340 can then deliver the purchased software stack, install and configure the software application stack at a third party site such as server farm 350 or store the software application stack in a storage farm 355 for the user to retrieve.

Server farm 350 can be configured to provide computing platforms for users to lease. Accordingly, users can have a backup version of their systems, a testing platform to perform quality assurance tests on new applications or new software appliances, execute a program requiring excessive MIPS, or any other similar computing task. Additionally, server farm 350 can be configured to store software appliances for download by users 105.

Storage farm 355 can be configured to provide storage space for users to lease. Accordingly, users can lease disk storage space to back up data, provide a hot data swap, or other storage intensive tasks. Additionally, storage farm 355 can be configured to store software appliances for download by users 105.

In some embodiments, AS module 120 can be configured to be executed in one of the other components (not shown). As illustrated, in other embodiments, AS module 120 can be executed as a standalone module.

Figure 4:
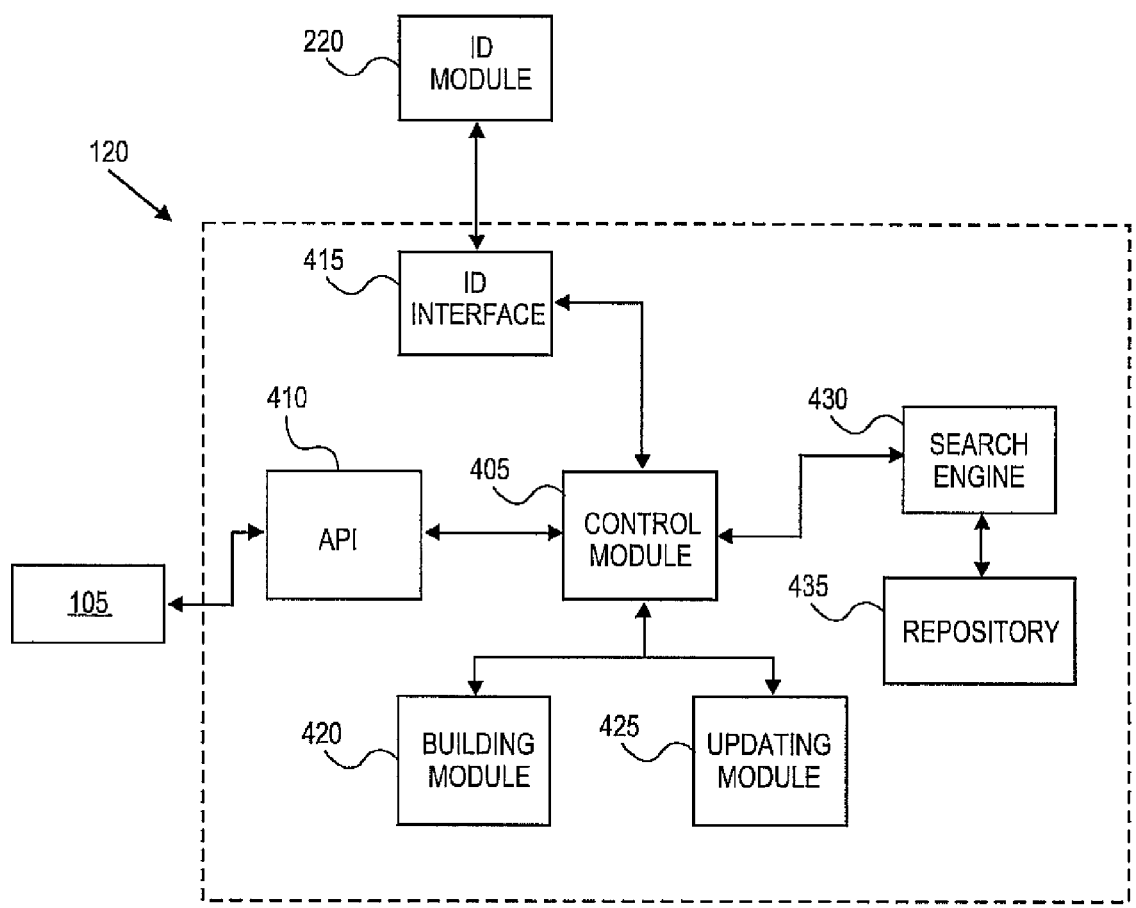
FIG. 4 depicts an exemplary AS module shown in FIG. 1 in accordance with yet another embodiment.

FIG. 4 depicts a more detailed block diagram of AS module 120 in accordance with another embodiment. It should be readily apparent to those of ordinary skill in the art that AS module 120 depicted in FIG. 4 represents a generalized schematic illustration and that other components may be added or existing components may be removed or modified.

As shown in FIG. 4, AS module 120 can comprise a control module 405, an application program interface ("API") 410, an identification ("ID") interface 415, a building module 420, an updating module 425, a search engine 430, and a repository 435. It should be readily obvious to one of ordinary skill in the art that the modules 405-435 can be implemented as software applications (programmed in C, C++, JAVA, PHP, etc.), hardware components (EEPROM, application specific integrated circuit, microprocessor, etc.) or combinations thereof.

Control module 405 can be configured to manage and interface with the other modules 410-435 to provide the functionality of the AS module 120 as described above and further described herein below. Additionally, control module 405 can be configured to interface with other modules such as ID module 220 via ID interface 415 as described above and further described herein below.

API 410 can be configured to generate GUIs, e.g. dialog boxes, web pages, as required by control module 405 and to provide an interface to other modules of web service portal 115. API 410 can be configured to operate in conjunction with web store 305 and API 310. For example, when a user 105 requests a software appliance related to a service or product via web store 305, API 310 can pass the request to API 410. One skilled in the art will realize that API 410 is optional and that the functionality of API 410 can be performed by API 410.

AS module 120 can be configured to receive a request for a demo appliance. The demo software appliance can be a limited functionality software appliance that a user can evaluate and review. For example, the user can request a customer relationship management (CRM) appliance. In particular, API 410 can be configured to receive a request for a software appliance via web service portal 115. As such, API 410 can be configured to generate web pages in order to receive the request.

Likewise, API 410 can be configured to operate in conjunction with other modules of web service portal 115 such as universal messaging module 325. For example, a user 105 can submit a request for a software appliance in a message, such as an email. As such, API 310 can pass the request from universal messaging module 325 to API 410.

Control module 405 can be configured to receive the user's request for a software appliance via API 410. Control module 405 can be configured to receive a request to build the demo software appliance. In order to build the demo software appliance, control module 405 can be coupled to repository 435. Repository 435 can be implemented in any structure such as a database. For example, repository 435 can be implemented utilizing any type of conventional database architecture using open source technologies, proprietary technologies, or combinations thereof.

Repository 435 can be configured to store various pre-built software appliances based on the different functionally typically requested by users. For example, repository 435 can maintain various pre-built software appliances for roles such as Email Server appliance, application server appliance, (CRM) appliance, enterprise resource planning (ERP) appliance, and the like. Repository 435 can be configured to store the binary image of the pre-built appliance. Repository 435 can also be configured to store a recipe of the software appliance. The recipe describes the bits that make up the software appliance.

As mentioned above in FIG. 2, the software appliance includes one or more application and MiniOS to support the applications. In addition to storing pre-built appliances and recipes, repository 435 can also be configured to store individual operating systems and individual applications. Repository 435 also can be configured to store versions of MiniOS to support individual applications. Repository 435 can be configured to store the individual applications, individual operating systems, and versions of MiniOS as separate binary images.

In order to build the demo software appliance, control module 405 can be configured to retrieve the pre-built appliance, the recipe, and/or the necessary components to build the demo software appliance based on the request, from repository 435. In order to locate and retrieve the pre-built appliance, the recipe, and/or components of the custom appliance, control module 405 can be coupled to search engine 430. Search engine 430 can be configured to allow control module 405 to search repository 435. Search engine 430 can allow control module 405 to search the repository based on the contents of the request.

In order to build the demo software appliance, control module 405 can be coupled to building module 420. After retrieving the pre-built appliance, the recipe, and/or components of the custom appliance, control module 405 can be configured to pass the retrieved pre-built appliance, the recipe, and/or components of the custom appliance to building module 420. Building module 420 can be configured to build the appliance from the pre-built appliance, the recipe and/or the components of the demo software appliance.

For example, if building module 420 receives a pre-built appliance, building module 420 can be configured to append a unique serial number to the pre-built appliance. Additionally, if building module 420 receives an application and a version of MiniOS, building module 420 can be configured to combine the bits of the binary image of the application and version of MiniOS in order to create the binary image of the custom software appliance. Building module 420 can be configured to use the recipe to build the appliance.

Additionally, if building module 420 receives an application and complete OS, building module 420 can be configured to generate a version of MiniOS to support the received application. Building module 420 can be configured to combine the bits of the binary image generated for the version of the MiniOS and the received application. Building module 420 can be configured to generate a unique serial number for the custom appliance and append the serial number to the demo software appliance.

After building the appliance, control module 405 can be configured to provide the demo software appliance to the user. Control module 405 can be configured to pass the demo software appliance to API 410. API 410 can then be configured to provide the appliance to the user. Likewise, API 410 can be configured to pass the demo software appliance to universal messaging module 325 in order to be transmitted to the user. For example, universal messaging module 325 can transmit the complete appliance to the user in an email message.

In the building process described above, control module 405 can also be configured to include identifying information of the user in the demo software appliance. As such, control module 405 can be configured to append ID information of the user requesting the appliance to the complete appliance. To achieve this, control module 305 can be coupled to ID interface 415. ID interface 415 can be coupled to ID module 320 of web service portal 115. Control module 405 can utilize ID interface 415 to retrieve the ID information for the user.

In embodiments, AS module 120 can be configured to include configuration data in the demo software appliance. The configuration data can be stored as metadata in the demo software appliance. The metadata can be created in any format such as a tuple or extensible markup language (XML) file. The configuration data can include data required to implement the demo software appliance as requested by the user, data necessary to allow the components of the demo software appliance to function together, and data required to function with systems implementing the demo software module. For example, if the demo software appliance is a CRM appliance, the configuration data can include reference to user information, reference to customer databases, and the like.

In embodiments, in order to operate as the demo software appliance, the configuration data can be defined in order to limit the functionality of the demo software appliance. For example, if the demo software is a CRM appliance, the configuration data can include access information and the user access information can be limited to a single person associated with the user.

AS module 120 can be configured to include the configuration data in the demo software appliance during the building of the demo software appliance. Likewise, the configuration data can be included and updated after building using a management tool as described above and herein below.

In embodiments, once the demo software application has been provided, AS module 120 can be configured to receive a request to migrate the demo software appliance to a production software appliance. The user can request migration, for example, if the user desires to purchase the software appliance. The production software appliance can have the functionality that was previously limited in the demo software appliance.

In embodiments, AS module 120 can be configured to migrate the demo software appliance by modifying the configuration data in order to provide full functionality to the demo software appliance that was previously limited. For example, if the demo software appliance was a CRM appliance as mentioned above, AS module 120 can modify the configuration data to grant access to all persons associated with the requesting user. AS module 120 can modify the configuration data using the management tool as described above and herein below.

In embodiments, AS module 120 can be configured to receive a request to scale the production software appliance. The scaling can involve modifying the production software appliance in order to allow the software appliance to utilize additional resources. For example, if the production software appliance is a CRM appliance including CRM server application and CRM database application, the CRM server application and CRM database application can be divided into separate appliances. As such, the separate appliances can be implemented and supported on distinct computing resources.

AS module 120 can be configured to scale the production software appliance by dividing the applications contained in the production software appliances into separate software appliances. To achieve scaling, AS module 120 can be configured to build the separate software appliances and allocate the appropriate configuration data to the separate software appliances. AS module 120 can build the software appliance using a building processes described above. Additionally, AS module 120 can be configured to modify the configuration data to include any additional configuration data required by the separate software appliances to function together to provide the overall functionality.

After scaling the production software appliance, AS module 120 can be configured to provide the separate appliances to the user. For example, control module 405 can be configured to pass the separate appliances to API 410. API 410 can then be configured to provide the separate appliances to the user. API 410 can be configured to pass the separate appliances to universal messaging module 325 in order to be transmitted to the user. For example, universal messaging module 325 can transmit the separate appliances to the user in an email message.

AS module 120 can be configured to maintain a record of appliances provided to users. In particular, control module 405 can be configured to generate a record of appliances provided to users. The record can include the all appliances provided to the user associated with the ID information of the user. The records can also include the unique serial numbers of the appliances.

AS module 120 can also be configured to update and upgrade previously provided appliances. To achieve this, control module 405 can be coupled to updating module 425. Updating module 425 can be configured to update and upgrade software appliances by several different processes.

Since a software appliance is a binary image, updating module 425 can be configured to updated or upgrade a software appliance by creating a completely new binary image of the entire software appliance incorporating the updates or upgrades. To update or upgrade the software appliance using a complete image, updating module 425 can be configured to create the updated or upgraded appliance. AS module 120 can be configured to provide the updated or upgraded appliance to the user to simply replace the existing software appliance.

Alternatively, updating module 425 can be configured to update or upgrade a software appliance incrementally. For each update or upgrade, updating module 425 can be configured to determine the bits of the binary image required to update or upgrade a software appliance. AS module 120 can be configured to provide the update or upgrade bits to the user. To update or upgrade the software appliance, the user can add the update or upgrade bits to the software appliance on a binary-difference basis.

AS module 120 can be configured to build the software appliance to include a management tool. AS module 120 can be configured to embed the management tool in the complete software appliance. The management tool can be configured to provide control, management, and maintenance of the software appliance. For example, the management tool can be utilized in order to start/stop, configure, repair, and update a software appliance. The management tool can be configured to manage the entire software appliance, including both applications and MiniOS of the software appliance. Likewise, the management tool can be configured to include multiple tools, for instance to manage applications and MiniOS of the software appliance. Likewise, the management tool can be a module in AS module 120 capable of communicating with the appliances.

Figure 5:
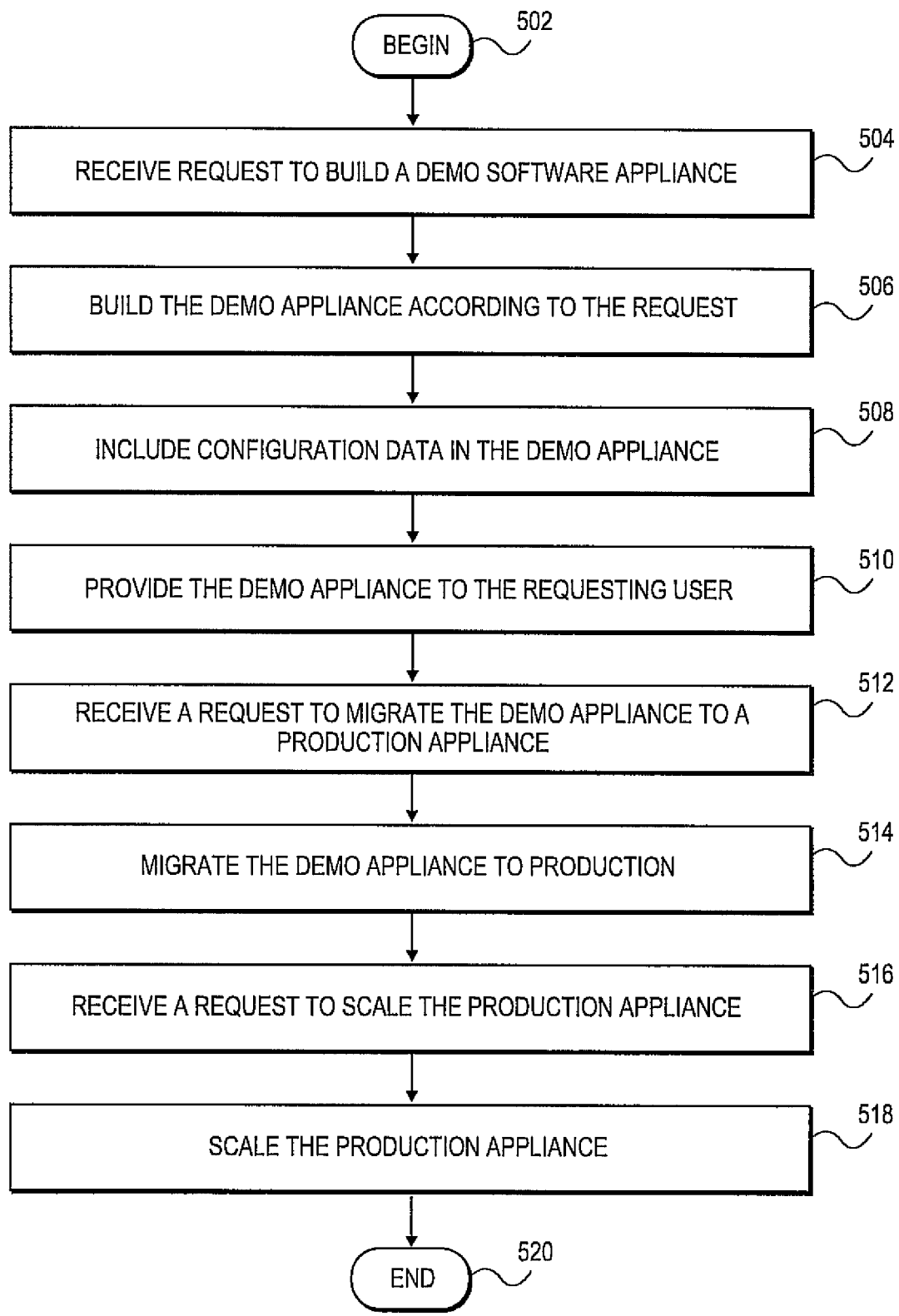
FIG. 5 illustrates a flowchart for overall appliance building in accordance with yet another embodiment.

FIG. 5 illustrates a flow diagram of overall appliance building, according to embodiments of the present teachings. In 502, processing can begin. In 504, AS module 120 can receive a request to build a demo software appliance from a user. The request can include a desired pre-built demo appliance or available applications to be included in a custom demo appliance.

In 506, AS module 120 can build the demo appliance by retrieving the pre-configured demo appliance or by constructing the custom demo appliance. To construct the custom demo appliance, AS module 120 can combine the applications with a minimum amount of an operating system to provide an execution platform for the applications.

In 508, AS module 120 can include configuration data in demo software appliance. The configuration data can include data that specifies the interaction of the applications and portions of OS in the demo software appliance. Additionally, the configuration data can include user specific data. In order to operate as a demo software appliance, the configuration data can be defined in order to limit the functionality of the demo software appliance. After the demo software appliance is built, in 510, AS module 120 can provide the demo software appliance to the requesting user. While AS module 120 can include the configuration data during the building process as illustrated, AS module 120 can include the configuration data after the demo software appliance has been provided to the requesting user.

In 512, AS module 120 can receive a request to migrate the demo software appliance to a production software appliance. The production software appliance can have the functionality that was previously limited in the demo software appliance. In 514, AS module 120 can migrate the demo software appliance by modifying the configuration data in order to provide full functionality to the demo software appliance that was previously limited.

In 516, AS module 120 can also receive a request to scale the production software appliance. In 518, AS module 120 can scale the production software appliance by dividing the applications contained in the production software appliances into separate software appliances. To achieve scaling, AS module 120 can build the separate software appliances and allocate the appropriate configuration data to the separate software appliances. Additionally, AS module 120 can modify the configuration data to include any additional configuration data required by the separate software appliances to function together to provide the overall functionality.

Then, in 520, the processes can terminate, but the process can return to any point and repeat.

Figure 6:
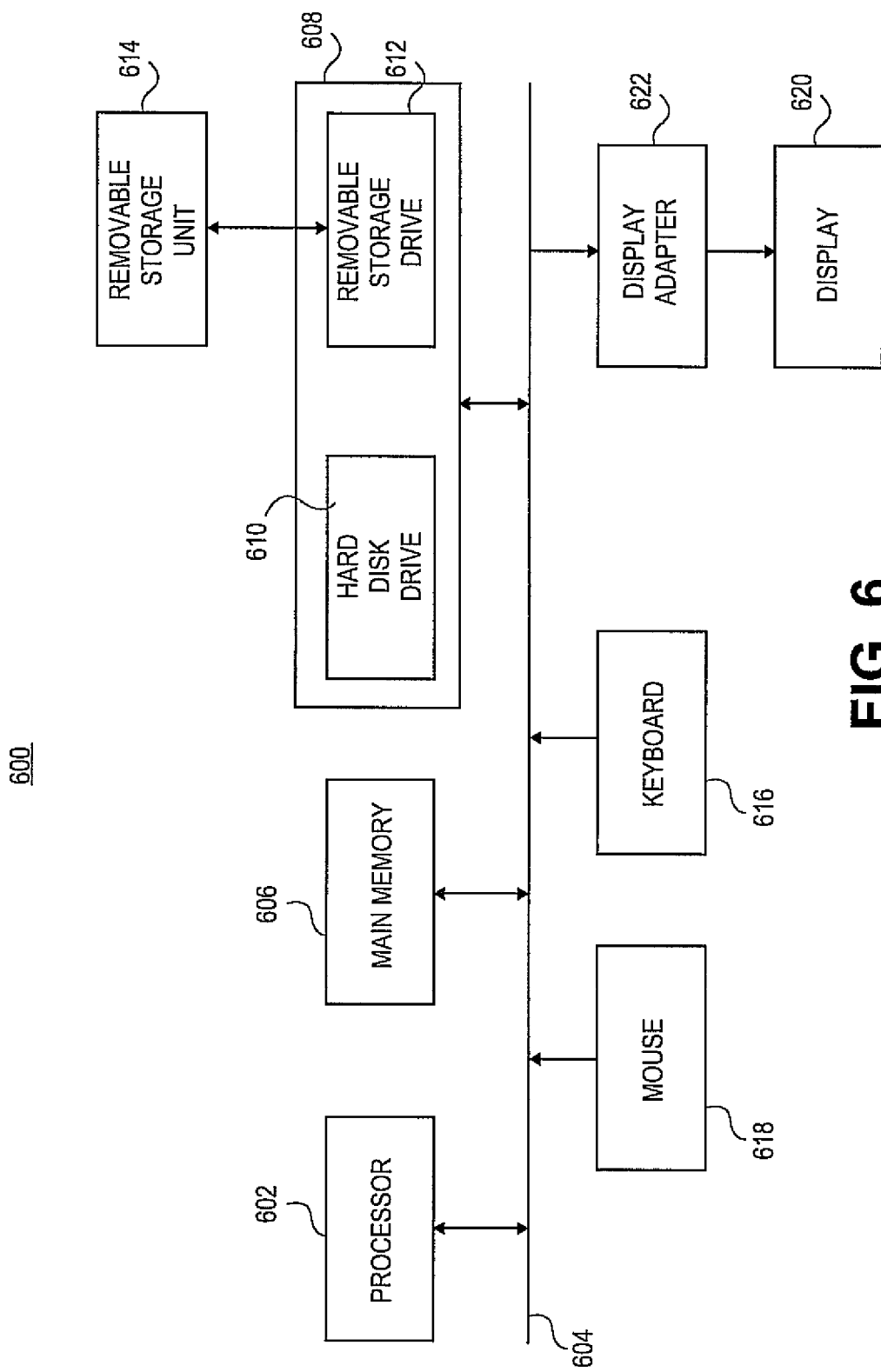
FIG. 6 depicts an exemplary computing platform in accordance with yet another embodiment.

FIG. 6 illustrates an exemplary block diagram of a computing platform 600 where an embodiment may be practiced. The functions of the AS module 120 can be implemented in program code and executed by computing platform 600. AS module 120 may be implemented in computer languages such as PASCAL, C, C++, JAVA, etc.

As shown in FIG. 6, computing platform 600 includes one or more processors, such as processor 602 that provide an execution platform for embodiments of AS module 120. Commands and data from processor 602 are communicated over a communication bus 604. Computing platform 600 also includes a main memory 606, such as a Random Access Memory (RAM), where AS module 120 can be executed during runtime, and a secondary memory 608. Secondary memory 608 includes, for example, a hard disk drive 610 and/or a removable storage drive 612, representing a floppy diskette drive, a magnetic tape drive, a compact disk drive, etc., where a copy of a computer program embodiment for AS module 120 can be stored. Removable storage drive 612 reads from and/or writes to a removable storage unit 614 in a well-known manner. A user interfaces with the AS module 120 with a keyboard 616, a mouse 618, and a display 620. Display adapter 622 interfaces with the communication bus 604 and display 620. Display adapter 622 also receives display data from processor 602 and converts the display data into display commands for display 620.

Additionally, software appliances including management tools, such as software appliance 200, can be implemented on an exemplary computing platform 600. For example, processor 602 can provide an execution platform for embodiments of the software appliance. The software appliance can be executed during runtime on main memory 606. The binary image of the software appliance can be stored in secondary memory 608.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
 receiving a request for a software appliance, wherein the request specifies an application to be tested;
 building, by a processor, the software appliance, the software appliance comprising:
  a limited-functionality version of the application for testing,
  only a portion of an operating system necessary to provide an execution platform for the limited-functionality version of the application, wherein the portion of the operating system is less than a whole operating system, and
  configuration data comprising user-specific data required to implement the limited-functionality version of the application with a user-specific system;
 receiving a request to migrate the software appliance to a production software appliance;
 migrating the software appliance to the production software appliance comprising the full functionality version of the application by modifying the configuration data to establish a full functionality version of the application;
 receiving a request to scale the production software appliance, wherein the production software appliance comprises a plurality of applications; and building separate production software appliances for one or more of the plurality of applications, wherein each of the separate production software appliances comprises:
a subset of the plurality of applications,
only a portion of the operating system necessary to provide an execution platform for the subset of the plurality of applications, wherein the portion of the operating system is less than a whole operating system; and
a portion of the configuration data utilized by the subset of the plurality of applications and the portion of the operating system.

2. The method of claim 1, wherein the software appliance comprises a binary image of data embodying the software appliance.

3. The method of claim 1, wherein the modified configuration data comprises requester specific configuration data.

4. The method of claim 1, wherein migrating the software appliance to the production software appliance comprises transmitting the modified configuration data to the software appliance.

5. The method of claim 1, further comprising:
modifying the configuration data to comprise additional data that enables the separate production software appliances to operate together.

6. A system comprising:
a memory to store an application; and
a processor operatively coupled to the memory, the processor to:
receive a request for a software appliance, wherein the request specifies the application to be tested,
build the software appliance, the software appliance comprising:
a limited-functionality version of the application for testing;
only a portion of an operating system necessary to provide an execution platform for the limited-functionality version of the application, wherein the portion of the operating system is less than a whole operating system, and
configuration data comprising user-specific data required to implement the limited-functionality version of the application with a user-specific system,
receive a request to migrate the software appliance to a production software appliance,
migrate the software appliance to the production software appliance comprising the full functionality version of the application by modifying the configuration data to establish a full functionality version of the application,
receive a request to scale the production software appliance, wherein the production software appliance comprises a plurality of applications; and
build separate production software appliances for one or more of the plurality of applications, wherein each of the separate production software appliances comprises:
a subset of the plurality of applications,
only a portion of the operating system necessary to provide an execution platform for the subset of the plurality of applications, wherein the portion of the operating system is less than a whole operating system; and
a portion of the configuration data utilized by the subset of the plurality of applications and the portion of the operating system.

7. The system of claim 6, wherein the software appliance comprises a binary image of data embodying the software appliance.

8. The system of claim 6, wherein the modified configuration data comprises requester specific configuration data.

9. The system of claim 6, wherein migrating the software appliance to the production software appliance comprises transmitting the modified configuration data to the software appliance.

10. The system of claim 6, the processor to modify the configuration data to comprise additional data to enable the separate production software appliances to operate together.

11. A non-transitory computer readable storage medium including instructions that, when executed by a processor, the processor to:
receive a request for a software appliance, wherein the request specifies an application to be tested; and
build, by the processor, the software appliance, the software appliance comprising:
a limited-functionality version of the application for testing,
only a portion of an operating system necessary to provide an execution platform for the limited-functionality version of the application, wherein the portion of the operating system is less than a whole operating system, and
configuration data comprising user-specific data required to implement the limited-functionality version of the application with a user-specific system;
migrate the software appliance to the production software appliance comprising the full functionality version of the application by modifying, by the processor, the configuration data to establish a full functionality version of the application;
receive a request to scale the production software appliance, wherein the production software appliance comprises a plurality of applications; and
build separate production software appliances for one or more of the plurality of applications, wherein each of the separate production software appliances comprises:
a subset of the plurality of applications,
only a portion of the operating system necessary to provide an execution platform for the subset of the plurality of applications, wherein the portion of the operating system is less than a whole operating system; and
a portion of the configuration data utilized by the subset of the plurality of applications and the portion of the operating system.

12. The non-transitory computer readable storage medium of claim 11, wherein the software appliance comprises a binary image of data embodying the software appliance.

13. The non-transitory computer readable storage medium of claim 11, wherein the modified configuration data comprises requester specific configuration data.

14. The non-transitory computer readable storage medium of claim 11, the processor to transmit the modified configuration data to the software appliance.

15. The non-transitory computer readable storage medium of claim 11, the processor to:
modify the configuration data to comprise additional data to enable the separate production software appliances to operate together.

\* \* \* \* \*